P. MUELLER & A. C. SCHUERMANN.

SANITARY DRINKING FOUNTAIN.

APPLICATION FILED OCT. 22, 1914.

Reissued Aug. 10, 1915.

13,960.

Witnesses

H. C. Robinette

J. M. Stuke

Inventors

Philip Mueller

A. C. Schuermann

By Lyon & Lyon & Rea

Attorneys

UNITED STATES PATENT OFFICE.

PHILIP MUELLER AND ANTON C. SCHUERMANN, OF DECATUR, ILLINOIS, ASSIGNORS TO THE H. MUELLER MANUFACTURING COMPANY, OF DECATUR, ILLINOIS, A CORPORATION OF ILLINOIS.

SANITARY DRINKING-FOUNTAIN.

13,960. Specification of Reissued Letters Patent. Reissued Aug. 10, 1915.

Original No. 1,020,923, dated March 19, 1912. Serial No. 617,475. Application for reissue filed October 22, 1914. Serial No. 868,143.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Sanitary Drinking-Fountains, of which the following is a specification.

This invention relates to drinking fountains and has for its main object to provide a nozzle therefor that shall be thoroughly sanitary in all respects, and so constructed that a person drinking therefrom cannot, without having his face and nose filled with water, contaminate the nozzle by placing his lips or any part of his face, in contact therewith.

This invention, therefore, has for one of its objects the provision of a drinking fountain discharging a bubbling or upwardly flowing stream of water for drinking purposes, and a number of small upwardly projected streams of water which, together, form a protecting wall or curtain surrounding the nozzle and the lower portion of the drinking stream, said protecting streams not rising as high as the drinking stream, so that a person may drink from the top of the latter stream without being interfered with by the protecting streams.

A further, and equally important, object of the invention relates to the manner of directing the water delivered to the nozzle from a common supply pipe through independent passageways, one leading to the drinking nozzle, and the other to the outlets for the small streams, which form the protecting wall or curtain, and the provision of a valve or regulating means in each of said passageways to regulate the pressure and speed of the water in such independent passageways, whereby the height to which it rises above the outlets may be properly regulated. Baffling means are also employed to impede the water as it travels toward the outlets.

Figure 1:
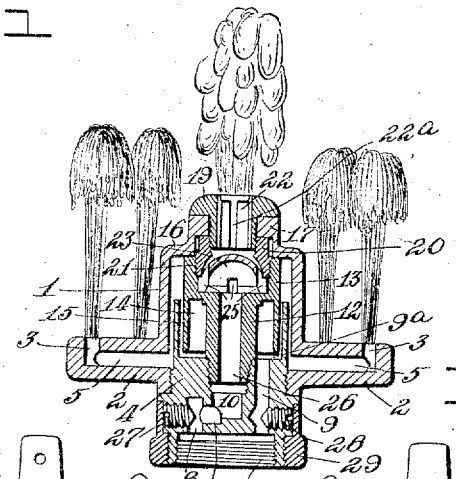
Figure 2:
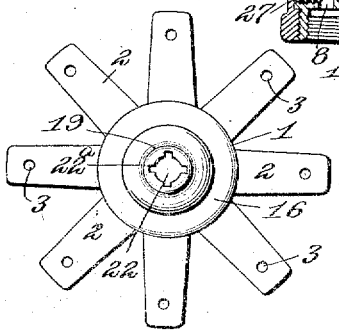
Figure 3:
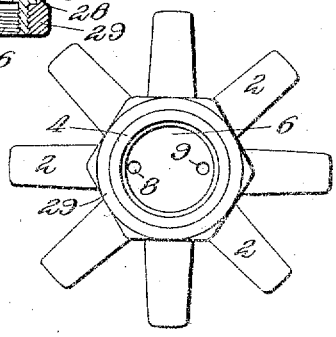
Figure 4:
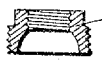
Figure 5:
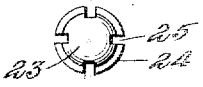

In the drawing, which accompanies and forms a part of this specification, Figure 1 is a vertical central sectional view of the improved drinking fountain. Fig. 2 is a top plan view of the same, Fig. 3 a bottom plan view, Fig. 4 is a vertical sectional view, and Fig. 5 a bottom view of a detail of the invention.

Similar reference numerals are used to indicate the same parts in all the figures.

In the drawing, the numeral 1 designates the body of the fountain nozzle, preferably cylindrical in form, from the lower end of which radiate a plurality of hollow fingers 2, the number of which is immaterial, having holes 3 near their outer ends communicating with the interior of said fingers and directed upwardly. The holes 3 may be disposed in a vertical direction as shown, or inclined toward or away from the axis of the nozzle. The body of the nozzle is made hollow and threaded interiorly at its lower end to receive a threaded bushing 4, which extends upwardly into said hollow body for some distance above the channels 5 in the fingers 2, which channels communicate with the interior of the nozzle body.

A threaded opening 6 is formed in the lower end of the bushing 4 for a short distance to screw on the end of the pipe or other fitting through which water is delivered to the nozzle. Passageways 8 and 9 are bored in the bushing 4 from the opening 6, the passage 8 extending but a short distance into said bushing, while the passageway 9 passes through the same and communicates with the bottom of a recess $9^a$ in the upper end of said bushing. An opening 10 is made in the center of the body 1 downwardly from the recess $9^a$ nearly to the threaded opening 6, said opening 10 connecting with the passage 8 by a port 11. The upper end of the opening 10 is preferably enlarged and threaded to receive a threaded stem 12 on a plug 13, which plug nearly fills the recess $9^a$ in the bushing. The underside of the plug 13 is cut away or depressed at 14, around the stem 12 leaving a skirt 15 at the periphery of the plug reaching nearly to the bottom of the recess $9^a$.

The top of the nozzle body 1 is shouldered at 16 to form a neck 17 centrally bored to permit the entrance thereinto of a nipple 19, the lower end of which is exteriorly threaded for a nut 20 which, in turn, is also exteriorly threaded to screw into a cavity 21 formed in the upper end of the plug 13. The nut 20 holds the nipple in position on the neck 17. An axial opening 22 is formed in the nipple for the passage of the drinking stream of water; said opening may be provided with vertical grooves 22ᵃ to produce a bubbling effect on the drinking stream.

The underside of the nut 20 is hollowed preferably in the form of a hemisphere into which projects a dome-shaped baffling member 23 having a circular flange 24 at its base and provided with a number of notches 25 cut therein to permit the passage of water. The baffling member 23 is depressed on its underside as shown in the drawing to impede and deflect the stream of water passing upwardly through a passageway 26 in the stem 12 of the plug.

For the purpose of regulating the flow of water to the outlets and the height of the drinking stream and of the streams which form the wall or curtain around the nozzle, a valve or other interfering means 27 is placed in the passageway 8, and a like device 28 in the passageway 9. These valves or interfering means are preferably in the form of headless screws having conical points which seat in depressions on the opposite sides of the respective channel ways 8 and 9. The screw valve 27 is for convenience placed in line with the port 11 so as to enter the same and limit the amount of water which can pass therethrough to the nipple. The screw valves 27 and 28 are threaded horizontally in openings on opposite sides of the bushing 4 and have their outer ends notched to receive a screw-driver, or other means, for adjusting the screws.

To prevent mischievous or malicious interference with the screw valves 27 and 28, a collar or shield 29 is threaded on the lower end of the bushing and extends up the sides thereof sufficiently high to cover the outer ends of said screw valves. By this means mischievously inclined people cannot tamper with the valves, but when an authorized person desires to adjust them he will be able to do so by unlocking or removing said shield.

In assembling, the various parts of the invention the stem 12 of the plug 13 is screwed into the opening 10 in the bushing 4 until the lower end of the skirt 15 of said bushing nearly reaches the bottom of the recess 9ᵃ, there being a narrow space between the skirt and the side of said recess. The baffling member is then inserted in the orifice 21 in the top of the plug, and the nut 20 screwed into said orifice until its lower end bears on the flange 24 of the baffling member to hold it securely in place. The bushing 4 is then screwed into the body 1 of the nozzle and the nipple 19 slipped through the opening in the neck 17 and screwed into the nut. This completes the assemblage and the nozzle is ready to be attached to the inlet pipe.

Constructed and arranged as above described, the water enters the opening 6 and divides, part passing up through the passageway 8, and part through the passageway 9 past the valves 27 and 28 in said passageways. From the passageway 8 water passes through the port 11 into the opening 10 and bore 26 to strike against the underside of the baffling member, which decreases its force and deflects it laterally through the slots 25 into the chamber formed in the nut 20, passing from thence through the central opening 22 in the nozzle to form the drinking stream. From the passageway 9 water passes into the depression 14 in the underside of the plug 13, striking the top of said depression thence deflecting downwardly and around the skirt 15 and up between said skirt and the wall of the cavity 9ᵃ. Passing over this wall it descends through the narrow annular space between the bushing and the body 1 to the channels 5 in the fingers 2, and, passing out through the openings 3, it is projected upwardly as shown in Fig. 1 to form the protecting wall or curtain around the nipple 19. It will be noted from the above that the course of the water is more or less tortuous, striking the baffling members, turning corners, and in other ways having its pressure reduced so that when it emerges into the air it rises to the height desired in solid masses and with little force so that especially with respect to the drinking stream, there is no danger of the water splashing into the drinker's face when he places his mouth over the stream to drink. But should he heedlessly or intentionally attempt to place his lips on the nipple 19 one or more of the streams forming the protecting wall will fill his face and nose with water, thereby naturally causing a quick withdrawal before his lips have touched the nipple.

Having fully described our invention what we claim is:—

1. A drinking fountain comprising a nozzle having a hollow body with a plurality of radial tubular fingers, an upwardly directed opening in each finger at its outer end, a nipple having an outlet for a drinking stream extending downwardly through an opening in the upper end of said body, a bushing extending upwardly into said body and connected thereto, said bushing having passageways therein for water, and means connecting said bushing and nipple through which means water passes from one of said passageways to the outlet in the nipple, and from the other passageway around said connecting means to the tubular fingers where it flows through their terminal openings in streams above said nipple to form a curtain for the same.

2. A drinking fountain comprising a hollow nozzle, having a hollow body with a plurality of radial tubular fingers, an upwardly directed opening in each finger at its outer end, a nipple having an opening for a drinking stream extending upwardly through an opening in the upper end of said body, a bushing extending upwardly into said body and connected thereto, said bushing having passageways therein for water, means connecting said bushing and nipple through which means water passes from one of said passageways to the outlet in the nipple, and from the other passageway around said means to the tubular fingers, and out through their terminal openings, each passageway being provided with a separate means for regulating the flow of water therethrough.

3. A drinking fountain comprising a hollow nozzle, having a hollow body with a plurality of radial tubular fingers, an upwardly directed opening in each finger at its outer end, a nipple having an outlet for a drinking stream of water extending downwardly through an opening in the upper end of said body, said outlet being above the plane of the terminal openings in the fingers, a bushing extending upwardly into said body and connected thereto, said bushing having passageways therein for water, and means connecting said bushing and nipple through which means water passes from one of said passageways to the outlet in the nipple and from the other passageway around said means to the tubular fingers where it flows through their terminal openings in streams above said nipple to form a curtain surrounding the same, adjustable regulating means in each of said passageways and means for deflecting the streams between said passage-ways and their outlets.

4. A drinking fountain comprising a nozzle having hollow body with a plurality of radial tubular fingers, an upwardly directed opening in each finger at its outer end, a nipple having an outlet for a drinking stream extending downwardly through an opening in the upper end of said body, a bushing extending upwardly into said body beyond the tubular fingers and connected thereto, said bushing having a recess in its upper end and passageways therein for water, a plug formed with a cavity in its upper end connected to said bushing, said plug nearly filling the recess in the bushing, and having a recess in its under side, a stem extending downwardly from the plug and having an opening connecting the cavity therein with one of the passageways in the bushing, and a threaded connection between said plug and said nipple, the arrangement being such that water entering through one of said passageways passes through the plug to the drinking fountain and through the other passageway around said plug to the hollow fingers and their terminal openings.

5. A drinking fountain comprising a nozzle having a hollow body with a plurality of radial tubular fingers, an upwardly directed opening in each finger at its outer end, a nipple having an outlet for a drinking stream of water extending downwardly through an opening in the upper end of said body, said outlet being on a higher plane than the openings in the tubular fingers, a bushing extending upwardly into the body beyond the tubular fingers and threaded into said body, said bushing having a recess in its upper end, a plug formed with a cavity in its upper end and of slightly less diameter than said recess inserted therein, a stem extending downwardly from said plug and threaded into an opening in the bushing, the underside of the plug being formed with an annular chamber opening downwardly near the bottom of the recess in the bushing, a nut threaded in the cavity in said plug and having a centrally threaded opening for the threaded lower end of the nipple, a hollow baffling member seated in the cavity in the plug and held in place by said nut, said baffling member having slots in the edges thereof, a passageway in the nozzle for conveying water to the nipple to form the drinking stream, a second passageway separate from the first through which water passes to the tubular fingers, and means in each passageway for regulating the flow of water therethrough.

6. A drinking fountain comprising a body, a nozzle connected to the body and from which a drinking stream is adapted to flow in an upward direction, a plurality of hollow arms projecting from said body, each arm having an opening on its upper side for the outflow of a protecting stream of water, which streams surround the drinking stream, means for regulating the flow of the drinking stream, and separate means for regulating the flow of the protecting streams.

7. A drinking fountain comprising a body provided with two independent water passage-ways for the discharge, respectively, of a drinking stream and a water curtain for the fountain, and means located in each of said water passage-ways for independently regulating the flow of water therethrough.

8. A drinking fountain comprising a body provided with two independent water passageways, a vertical outlet connected to one passageway for the discharge of the drinking stream, means spaced from said body provided with a series of small upwardly opening holes in communication with the other independent passageway through which holes small streams pass upwardly above the drinking stream outlet to form a curtain or wall about the same, and means in each of said water passageways for independently regulating the flow of water therethrough.

9. A drinking fountain comprising a nozzle having an outlet for a vertical drinking stream of water, a series of small outlets arranged concentrically therewith through which outlets small streams of water are projected to form a protecting wall around the drinking stream outlet, and two tortuous passageways, one leading to the drinking stream outlet and the other to the small outlets, an independent adjustable means for each passageway for regulating the flow, pressure and height of said streams of water, and deflectors in each passageway to change the course of the streams.

10. A drinking fountain comprising a nozzle having an outlet for a vertical drinking stream of water, a series of small outlets arranged concentrically therewith through which outlets small streams of water are projected to form a protecting wall around the drinking stream outlet, a removable nipple having an opening therethrough for the passage of the drinking stream, said opening having vertically grooved passages therein, and two tortuous passageways, one leading to the drinking stream outlet and the other to the small outlets, independent adjustable means in each passageway for regulating the flow, pressure and height of said streams of water, and deflectors in each passageway to change the course of the streams.

11. A drinking fountain comprising a nozzle having an outlet for a vertical drinking stream of water, a series of small outlets arranged concentrically therewith through which outlets small streams of water are projected to form a protecting wall around the drinking stream outlet, and two tortuous passageways, one leading to the drinking stream outlet and the other to the small outlets, independent adjustable means in each passageway for regulating the flow of said streams of water, a removable plug within the nozzle having a recess in its upper end and a central opening connected to said recess and forming a part of the drinking stream passageway, a nozzle threaded into the recess in said plug, and provided with an opening forming the outlet for the drinking stream, and baffling means for retarding and deflecting the course of the two streams of water within the nozzle.

12. A drinking fountain comprising a nozzle having an outlet for a vertical stream of water, a series of small outlets arranged concentrically therewith, through which outlets small streams of water are projected to form a protecting wall around the drinking stream outlet, and two tortuous passageways, one leading to the drinking stream outlet and the other to the small outlets, and independent adjustable means in each passageway for regulating the flow of said streams of water, a plug insertable within said nozzle and having an upper and lower recess, a stem projecting from the bottom of said plug and threaded into the nozzle, a baffling member in the upper recess of the plug, and a nipple threaded into said recess and holding said baffling member in place.

13. A drinking fountain comprising a nozzle having an outlet for a vertical stream of water, a series of small outlets arranged concentrically therewith, through which outlets small streams of water are projected to form a protecting wall around the drinking stream outlet, and two tortuous passageways, one leading to the drinking stream outlet and the other to the small outlets, a plug insertable within said nozzle and having an upper and lower recess, a stem projecting from the bottom of said plug and threaded into the nozzle, a baffling member in the upper recess of the plug, and a nipple threaded into said recess and holding said baffling member in place.

14. A drinking fountain comprising a nozzle having an outlet for a drinking stream, and a series of concentrically arranged outlets through which streams of water may pass to form a curtain surrounding and extending above the drinking stream outlet, said nozzle having two separate passages therethrough leading one to the drinking stream outlet, and the other to the outlets of the streams forming the protecting curtain, a regulating means in each passageway to limit the amount of water passing to said outlets, said regulating means being adjusted from without the nozzle, and an annular shield threaded on the nozzle and adapted to cover the openings in the nozzle leading to the regulating means.

In testimony whereof we have hereunto set our hands in the presence of two subscribing witnesses.

PHILIP MUELLER.
ANTON C. SCHUERMANN.

Witnesses:
MABEL MCINTYRE,
CHARLES G. AUER.